United States Patent

[11] 3,584,231

| | | |
|---|---|---|
| [72] | Inventor | Richard Munro Dorward<br>Webley, England |
| [21] | Appl. No. | 758,424 |
| [22] | Filed | Sept. 9, 1968 |
| [45] | Patented | June 8, 1971 |
| [73] | Assignee | The General Electric Company, Limited<br>London, England |

[54] BISTABLE ELECTRIC CIRCUITS
4 Claims, 2 Drawing Figs.

[52] U.S. Cl. .................................................. 307/221,
307/224, 307/291, 307/293
[51] Int. Cl. .................................................. H03k 23/22,
H03k 3/286
[50] Field of Search ....................................... 307/291,
292, 215, 221, 224, 293; 328/51

[56] References Cited
UNITED STATES PATENTS

| | | | | |
|---|---|---|---|---|
| RE.26,082 | 9/1966 | Osborne | | 307/291 |
| 3,042,815 | 7/1962 | Campbell | | 307/291 |
| 3,171,039 | 2/1965 | Lorenz | | 307/291 |
| 3,217,177 | 11/1965 | Walker | | 307/215 |
| 3,283,180 | 11/1966 | Pressman | | 307/215 |

OTHER REFERENCES

J. D. Goodell, Journal of Computing Systems, Jan. 1953, Pp. 21, 22 and 92.

*Primary Examiner*—Donald D. Forrer
*Assistant Examiner*—L. N. Anagnos
*Attorney*—Kirschstein, Kirschstein and Ottinger ABSTRACT: In a P.C.M. shift-register timing-generator the steering circuit of each bistable stage is fed from the output of the preceeding driving bistable stage by way of a delay line in order to delay the loading of the driving bistable, when it is switched, by the shunt capacitance of the steering circuit until the driving bistable has safely acquired its new switched condition.

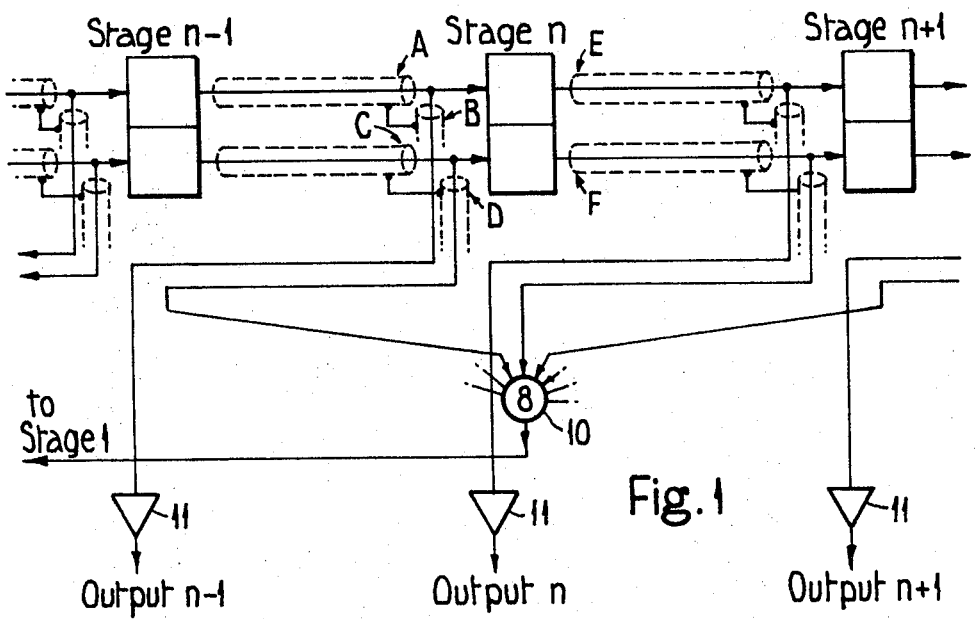
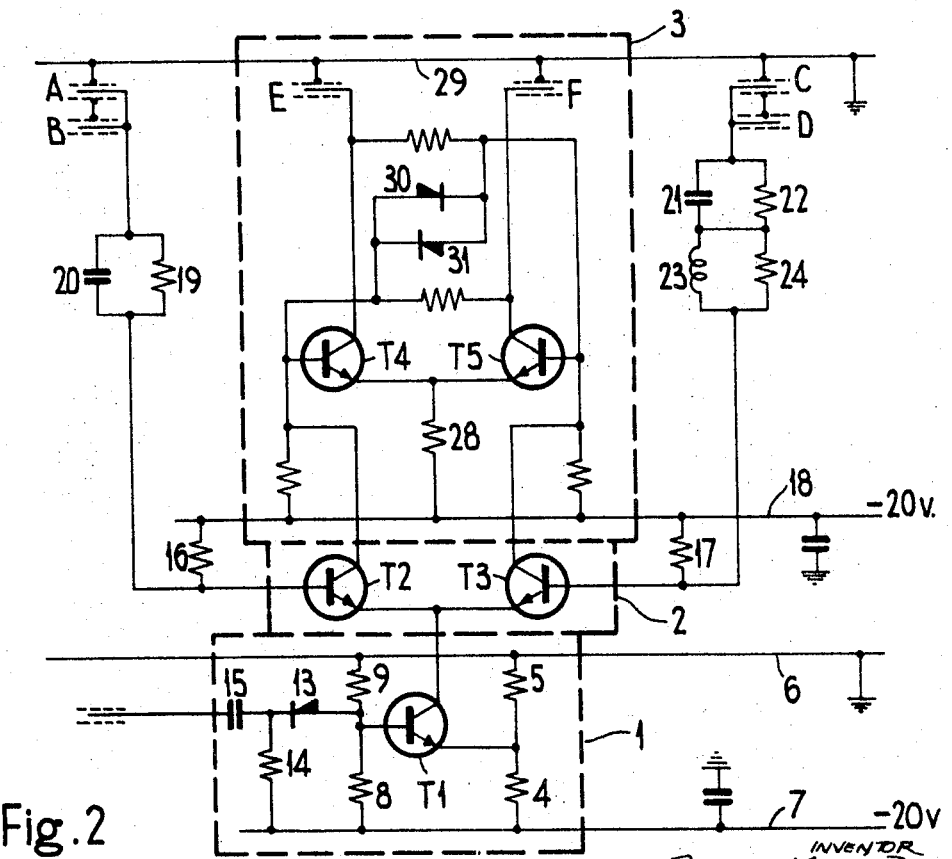

BISTABLE ELECTRIC CIRCUITS

This invention relates to two-state electric circuits.

More particularly the invention is concerned with two-state circuits of the kind comprising a pair of cross-connected transistors each biased in dependence upon the conduction state of the other. One or both of the states may be stable and they may be defined by the conduction of one, both, or neither of the transistors.

In a well-known form of bistable circuit of this kind, each of the pair of transistors has an associated resistor connected in its collector electrode circuit while the base electrode of each transistor is voltage biased by way of an associated bias resistor which is connected between that electrode and the collector electrode of the other transistor. This biasing arrangement ensures that in each of the two stable states of the circuit, one of the transistors is conducting and the other is cut off and it will be appreciated that the collector electrode voltage of either of the transistors is dependent at any time upon the stable state of the circuit. This voltage may be used by a steering network to control the supply of pulses which are utilized either to switch the bistable circuit in question or to switch another bistable circuit which may be of similar form. In either of these cases the steering network usually presents to the collector electrode circuit of the transistor from which the voltage is taken a load impedance which has a parallel capacitive component. Since this load impedance effectively shunts the resistor connected in the collector electrode circuit of the transistor in question, the parallel capacitive component of the load impedance prevents the voltage supplied to the steering network changing rapidly when the bistable circuit is switched.

In particular, if the transistor to which the steering network is connected is initially conducting and the circuit is then switched by the supply of a pulse to the base electrode to cause that transistor to be cut off, there is a finite delay before the collector electrode voltage changes sufficiently for the bias applied to the base electrode of the other transistor to cause it to conduct. Since bias is not applied to the base electrode of the pulsed transistor to hold it cut off until the other transistor is conducting, it is necessary for the switching pulse to have a sufficiently long duration for that state of affairs to occur. In other words the parallel capacitive component of the load impedance makes it necessary for triggering pulses to be of longer duration than would otherwise be the case. (It will be appreciated that if both transistors have load impedances with capacitive components connected thereto, the delay in changing the bistable circuit from one stable state to the other is even greater so that each triggering pulse must be of still longer duration.) This limitation on the duration of triggering pulses sets an upper limit to the speed of operation of the bistable circuit.

One object of the present invention is to provide a form of two-state circuit in which the effects discussed above of a load impedance having a parallel capacitive component are reduced.

According to the present invention, in a two-state electric circuit of the kind comprising a pair of cross-connected transistors and a load impedance across which in operation a voltage is developed dependent upon the state of the circuit, the load impedance has a capacitive component and is connected to the collector electrode circuit of one of the transistors by way of a length of transmission line.

In an application of the invention, a shift register comprises a plurality of bistable circuits each according to the invention and each including a transistor steering circuit having two transistors each of which controls a respective one of the bistable circuit transistors, and wherein the collector electrode circuits of each bistable circuit are respectively connected to the base electrodes of the steering circuit transistors in a different one of said stages, said base electrodes providing said capacitive component.

A bistable electric circuit in accordance with the present invention, will now be described, by way of example, with reference to the accompanying drawing of which:

FIG. 1 is a schematic diagram of several stages of a cyclic shift register, and FIG. 2 is a circuit diagram of one stage of the register.

The bistable circuit to be described consists of a modification of the prior arrangement of bistable circuit hereinbefore described in which modification the said resistor in the collector electrode circuit of each of the transistors is replaced by one end of a short length of coaxial transmission line, each of these transmission lines having a characteristic impedance equal to the resistance of the resistor replaced thereby while the resistive circuit is now completed at a remote point of the transmission line.

The shift-register, part of which is shown in FIG. 1, is employed as a timing pulse generator for a high speed pulse-code-modulation (P.C.M.) system.

The timing generator is required to accept a signal having a frequency of up to 130 mc./s. which is sufficient to accommodate a 6 mc./s. television video signal in a single channel containing a 9-bit code. The output signal of the generator is required to be a pulse in one or more selected time slots of the nine and this signal or signals is used for synchronizing purposes.

Referring to FIG. 1 a shift register with feedback is used as the timing generator. The register has nine binary stages, several of which are shown, these being referenced $(n-1)$, $n$, and $(n+1)$. From each of the first eight of these stages an output signal is taken to one of eight inputs of an eight input NAND gate 10. The output signal from this gate 10 is applied to a steering input of the first stage (not shown) with the result that when a '1' state occurs in the ninth stage and a '0' in all of the others the next stepping pulse causes the first stage to adopt the '1' state and all of the others the '0' state. A '1' is thus stepped through the register, each stage providing a cyclic output signal comprising one pulse and eight spaces. The signals from the successive stages are phase displaced so that a nine digit cycle having any desired phase (on the nine) is provided.

The stepping signal for the shift register is provided by a generator (not shown) operating at the basic digit rate and triggered by the received signal.

Each stage, such as stage $n$ shown in FIG. 2, of the shift register, comprises a current-pulse generator 1, a current-steering transistor circuit 2 and a bistable circuit 3. The current-pulse generator 1 is required to generate pulses suitable for switching transistors of the bistable circuit 3. An NPN transistor T1 has its emitter connected to the junction of two resistors 4 and 5 of values 50 ohms and 1.2 k ohms these being connected in that order between —20 volt and earth lines 7 and 6.

The base of transistor T1 is also connected to the junction of two resistors 8 and 9 of values 220 ohms and 1.5 k ohms respectively connected between lines 6 and 7, so that without further circuitry the transistor T1 is 'on' to the extent determined by the base and emitter resistors 4, 5, 8 and 9. Also connected to the base of transistor T1 is a rectifier diode 13 in series with a resistor 14 which is connected to the negative line 7. The diode is directed so as normally to draw current through the resistors 9 and 14 with which it is in series and thus lower the potential of the base of transistor T1 and cut off the transistor.

A drive or stepping input signal is applied to the cathode of rectifier diode 13 by way of a capacitor 15, the drive signal being a sinusoidal signal having the digit-rate frequency extracted from the received P.C.M. signal. At each positive going pulse of the drive signal the rectifier diode 13 is reverse biased and a pulse of collector current occurs, of amplitude determined by the base and emitter resistors mentioned above.

The steering circuit 2, mentioned above, comprises two NPN transistors T2 and T3 whose emitters are commoned and connected to the collector of the current generator transistor T1. The bases of these transistors T2 and T3 are connected by resistors 16 and 17 to a 20 volt line 18.

The base of transistor T2 is connected by means of a parallel R C circuit 19/20 to an intermediate point on the inner conductor of a coaxial line which supplies one of two output signals from the preceeding stage n—1 (on section A) to an output amplifier 11 (on section B) from which amplifier one of the nine final output signals is derived. This output amplifier 11 provides the DC termination of the coaxial line necessary for the completion of the collector path of a transistor in the preceding stage bistable circuit. The coaxial line interconnections are shown in FIG. 1.

The resistor 19 in conjunction with resistor 16 prevents the base of transistor T2 from becoming positive with respect to its collector, and therefore prevents saturation. Capacitor 20 presents a virtual short circuit at the frequency of operation and prevents attenuation of the HF pulse components otherwise caused by the divider effect of resistors 16 and 19. The base of the above steering transistor T2 provides a substantial parallel capacitance loading on the preceding stage and it is the temporary isolation of this capacitive loading from the preceding stage which is the subject of this invention. This temporary isolation is effected the the coaxial line section A.

The second steering transistor T3 has its base connected to an intermediate point on the inner conductor of a coaxial line C–D by way of a resistor/capacitor parallel combination 21/22 (having the same purpose as the corresponding combination 19/20 supplying transistor T2), in series with an inductor/resistor parallel combination 23/24. The coaxial line supplies the other output signal from the preceding state (on section C) to the eight input NAND gate (on section D) at the input of which the DC path for the collector of a second transistor in the preceding stage bistable circuit is completed.

The additional inductor 23 in the base connection of transistor T3 provides further isolation of the capacitance load thus reducing the residual degradation of the waveform applied to the NAND gate.

The bistable circuit 3 referred to above is based on a current switching transistor pair, as is the steering circuit 2. Two switching transistors T4 and T5 have their emitters connected directly together and to the negative line 18 by way of a 560 ohm resistor 28. The collectors are respectively connected to the 'inners' of two coaxial lines E and F the outer conductors of which are connected to an earth line 29. The ends of these coaxial lines remote from those shown are connected to the respective steering inputs of the following stage. The coaxial lines E and F thus constitute the coaxial lines A and C of the following stage, and the DC paths for the collectors of the transistors T4 and T5 are respectively completed in the output amplifier 11 of the following stage and in the NAND gate 10, by way of coaxial lines B and D of the following stage. Each collector is cross coupled to the other base by a 1 k ohm resistor, the bases being connected to the negative line 18 by respective 4.7 k ohm resistors.

The steering transistor collectors are connected to the respective bases of the switching transistors T4 and T5.

Between the bases of the switching transistors T4 and T5 are connected two semiconductor diodes 30 and 31 in parallel and oppositely directed. This interconnection of the bases forms the subject of Pat. Application Ser. No. 780,049 filed on the 29th Nov. 1968 in the name of Richard Munro Dorward and, in conjunction with the current switching technique on which the present register stage is based, permits faster operation by reducing the potential difference that may occur between the bases as a result of repeated switching to the same state. This reduction of p.d. limits the charge that may accumulate and hence reduces the time to remove it on a change of state.

The current switching technique referred to involves non saturation of the switching transistors T4 and T5, achieved by selection of the base and emitter bias resistors. The effect of this nonsaturation is that there is no excess charge to remove on switching—which would retard the switching operation. Again, by switching a limited current the voltage change necessary to effect this is correspondingly limited with the result that smaller charges are acquired by stray capacitance which charges are therefore more quickly removed on switching. A feature of this bistable circuit is that the cross coupling is only required to maintain bistability and not effect any switching. The emitter coupling means that 'drive' to one base of the switching transistors effects switching of both of them. Coupling capacitors between collector and opposite base are not therefore required and would in fact retard the switching operation.

In use, the nine stages of the shift register are driven by simultaneous sinusoidal signals supplied on coaxial lines to the individual current pulse generators 1. In an individual stage the drive pulse is steered by the steering transistors T2, T3 to the base of one of the switching transistors T4, T5. The current thus extracted from this base turns off the transistor (assuming it was previously on) the emitter coupling then causing the turn-on of the other transistor. The collectors of the switching transistors 'see' a purely resistive load for the brief period between onset of the switching pulse and its reflection due to the mismatch termination of the coaxial lines E and F. The current switching is thus unhindered by the parallel capacitive loading of the steering transistors T2 and T3 of the next stage. The base bias on the steering transistors of this next stage is determined by the state of the previous stage thus providing the usual pattern-shifting effect of a shift register.

With regard to the switching of the bistable circuit transistors T4 and T5 it will be appreciated that when a current pulse is extracted from the base electrode of the transistor that is conducting at any time for the purpose of cutting it off, the consequential change of collector electrode current is very rapid since the impedance immediately presented to the collector electrode circuit is essentially resistive. After a period equal to twice the time taken for a signal to be propagated along the length of transmission line (E or F), between the collector electrode of the switching transistor and the base electrode of the steering transistor, the capacitive loading of the steering transistor base electrode does temporarily modify the voltage wave form at the collector electrode, and this period is chosen to be sufficiently long for the bistable circuit 3 to settle down to its new stable state before the capacitive loading effect can make itself felt.

In this example, the transistors are silicon transistors having a cutoff frequency of the order of 500 megacycles per second and the minimum duration of switching pulses for satisfactory operation of the circuit is 2½ nanoseconds. Each of the coaxial transmission lines has a length of not less than 10 inches so as to give a propagation time of greater than 1¼ nanoseconds.

It will be appreciated that the two transmission lines instead of being coaxial line may be any other form of two-conductor line. Thus if the circuit is formed by a printed circuit technique, each of these lines may conveniently be a strip line.

Although the embodiment of the invention described above has been concerned with bistable circuits, it is to be understood that the use of a length of two-conductor transmission line to buffer the effect of the parallel capacitive component of a load impedance in slowing down the speed of switching is not so restricted. Thus, in its broadest aspect, the invention may also be applied to monostable circuits, although it will then provide any significant advantage in speeding up the switching operation only where the astable state duration is very short and comparable with the switching pulse duration.

In a modification of the bistable circuit described above the switching transistors T4 and T5 are of opposite type (that is, PNP) to the steering transistors T2 and T3 which arrangement inherently prevents the saturation of the steering transistors and obviates the potential divider resistors 19 and 22 and their associated circuitry.

I claim:

1. A two-stage electric circuit comprising: a pair of transistors each having base, emitter and collector electrodes; collector-tohbase cross connections between the transistors so that each transistor is biased in dependence upon the conducting state of the other; a load impedance having a capacitive component; and a length of transmission line by way of which the load impedance is connected to the collector electrode circuit of one of said pair of transistors, the transmission line being in series in the direct current path of said collector circuit and being of a length such that the propagation time between said collector electrode circuit and said capacitive component is not less than half the time that the circuit takes to change from one state to another, whereby said collector electrode circuit of said one transistor is isolated from said capacitive component during such a change.

2. A two-state electric circuit according to claim 1 wherein each state is a stable state.

3. A two-state electric circuit according to claim 2 wherein the collector electrode circuit of each transistor is connected to a separate said load impedance by way of a separate said length of transmission line.

4. A shift register comprising a plurality of two-state circuit stages each in accordance with claim 3 and each including a steering circuit comprising two transistors each of which has base, emitter and collector electrodes and is connected to a respective one of the pair of cross-connected transistors in that two-state circuit stage to control its conduction, and wherein the collector electrode circuits of the pair of cross-connected transistors in each two-state circuit stage are respectively connected to the base electrodes of the steering circuit transistors in a different one of said stages, the base electrodes of said steering circuit transistors providing said capacitive components.